Figure 1:
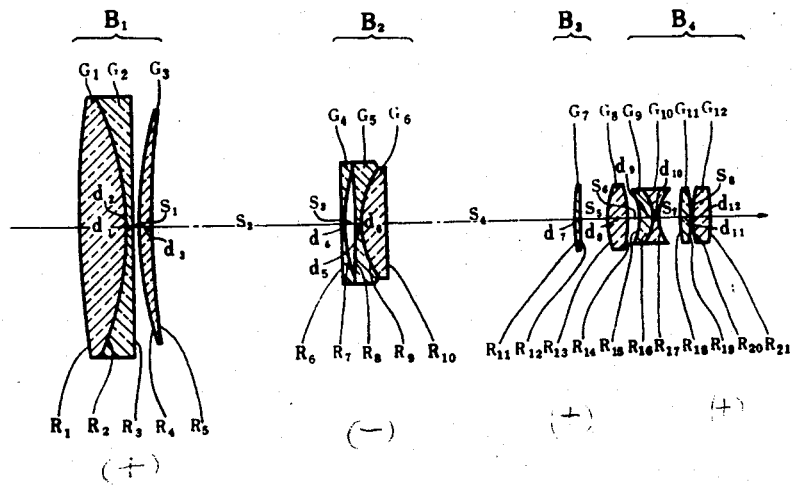

May 24, 1960  KEIZO YAMAJI  2,937,572
VARIFOCAL LENS SYSTEMS
Filed Jan. 14, 1958  2 Sheets-Sheet 1

INVENTOR.
KEIZO YAMAJI

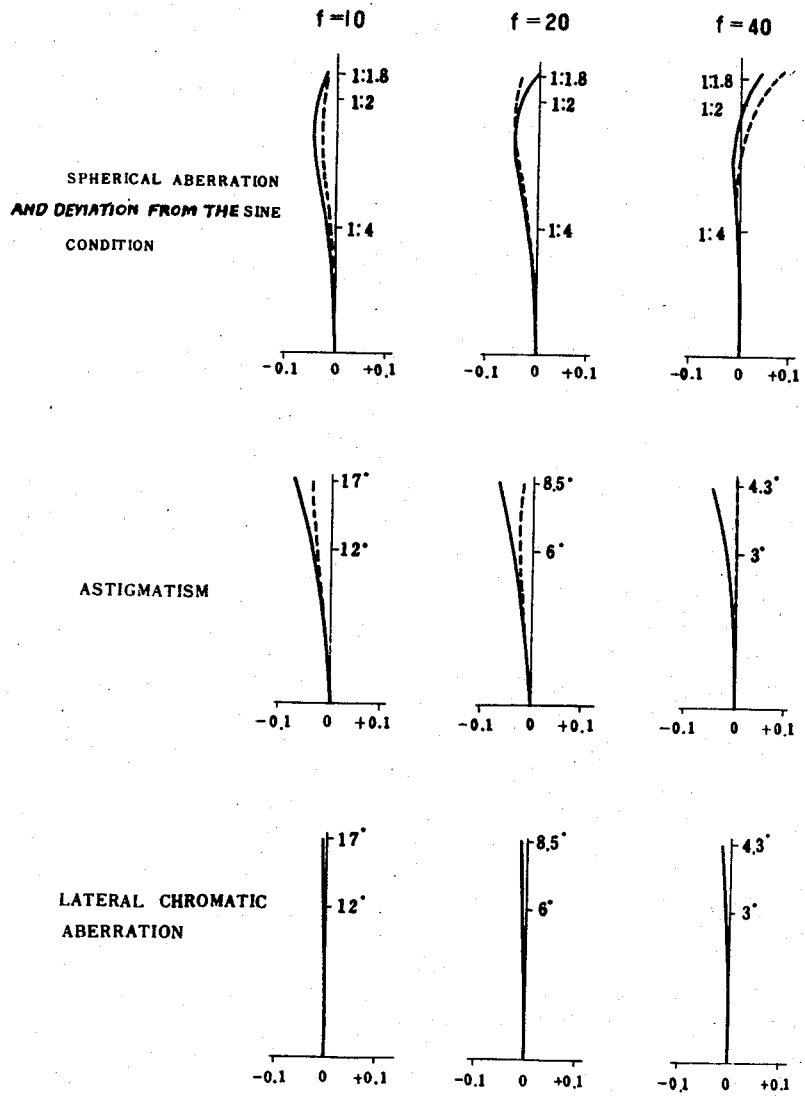

United States Patent Office 2,937,572
Patented May 24, 1960

2,937,572

VARIFOCAL LENS SYSTEMS

Keizo Yamaji, Tokyo, Japan, assignor to Canon Camera Company, Inc., Tokyo, Japan, a corporation of Japan Filed Jan. 14, 1958, Ser. No. 708,782

8 Claims. (Cl. 88—57)

This invention relates to varifocal lens systems and more particularly to a varifocal lens system of the type having three lens members.

An object of this invention is to provide a varifocal lens system well corrected for aberrations without reduction of the varifocal range.

Another object of the invention is to provide a varifocal lens system well corrected for aberrations while maintaining its aperture ratio large, the aberration correction being well maintained and stable over the relatively large varifocal range, and especially in which maximum correction for lateral chromatic aberration (chromatic aberration of the magnification) is achieved.

I accomplish the foregoing, and other, objects in that in the varifocal system of my invention the first member has positive refractive power, the second member has negative refractive power, and the third member has positive refractive power, all the members being aligned on a common optical axis, the second member being movable axially to vary the focal length or magnification of the whole lens system, with the first or third member being simultaneously movable axially relative to the second member to produce the final image at the identical predetermined position over the entire range of magnification.

A clear concept of the scope and purpose of this invention may be obtained from the following description, taken in connection with the attached drawing, in which:

Fig. 1 is a sectional view showing an embodiment of the varifocal lens system according to the present invention; and Fig. 2 is a series of graphs of the spherical aberration, deviation from the sine condition, astigmatism and lateral chromatic aberration in each of a long, medium and short focal length within the varifocal range.

The present invention will be further explained with reference to Fig. 1. The three lens members $B_1$, $B_2$ and $B_3$ are arranged on a common optical axis and have positive, negative and positive refractive powers, respectively. The second member $B_2$ is movable axially to vary the magnification of the whole system and simultaneously the first member $B_1$ or the third member $B_3$ is also movable axially relative to the second member $B_2$ in order to produce the final image at a predetermined, fixed position over the entire range of the variable magnification. The fourth member $B_4$, a relay lens, is located at the rear of the three members, $B_1$, $B_2$ and $B_3$, and is appropriately connected with such three members to adjust the focal length of the whole lens system.

The first lens member $B_1$ consists of a front positive $G_1G_2$ and a rear positive $G_3$ lens, separated by an air space $S_1$, the front lens being an achromatic compound lens consisting of a positive $G_1$ and a negative $G_2$ lens cemented together, the rear lens $G_3$ being a single thin meniscus lens of a refractive power greater than 0.4 times and smaller than 0.9 times the power of the first lens member, the radius of curvature $R_4$ of the front convex surface of the rear lens $G_3$ of the first lens member being greater than 0.4 times and smaller than once the focal length of the first lens member, and the radius of the rear concave surface of the same lens $G_3$ being greater than the focal length and less than infinity. The second lens member $B_2$ consists of a front negative $G_4$ and a rear achromatic compound, negative lens $G_5G_6$ separated by an air space $S_3$, front lens $G_4$ being a single lens of refractive power numerically larger than 0.4 times and smaller than 0.9 times the power of the second lens member, the radius of curvature $R_6$ of the front surface of the front lens $G_4$ being numerically greater than 3.0 times the focal length of the second member and smaller than infinity, and the radius of curvature $R_7$ of the rear concave surface of front lens $G_4$ is numerically greater than half and smaller than twice the focal length of the second member, while the rear lens $G_5G_6$ of the second member consists of a negative $G_5$ and a positive $G_6$ lens cemented together. The third member is a single positive lens $G_7$.

In the varifocal lens system embodiment of the invention in which the first and second members are movable while the third member $B_3$ is fixed in position, a fourth member $B_4$ aligned with and in combination with the third member $B_3$ serves as a relay lens. Member $B_4$ comprises a first convex lens $G_8$ airspaced from a compound cemented lens $G_9G_{10}$, airspaced from a second convex lens $G_{11}$ itself airspaced from a third convex lens $G_{12}$. When this varifocal lens system is used to take a photograph, the first member faces the object to be photographed, and when the lens system is used as a projection lens the first member faces the projection screen.

In general, the difficulties in designing a varifocal lens system of a large aperture ratio and of a wide varifocal range are summarized in two points, (1) correcting the aberrations by such construction as will result in almost no reduction of the varifocal range, and (2) keeping the aberrations of a large aperture ratio varifocal lens in acceptable amount, over the wide varifocal range. The lens system according to the present invention effectively overcomes the above mentioned difficulties. The reasons therefor are as follows:

When the first and second members of the lens system according to my invention are positioned closest to each other, the smallest magnification or the shortest focal length is obtained, while when the second and third members are positioned closest to each other, the largest magnification or the longest focal length is obtained. Therefore, the varifocal range is determined by the degree to which the adjacent members can be approached to each other. Thus, to obtain a wide varifocal range in this lens system, that is to say, to bring the adjacent members as close to each other as possible, the rear principal point of the first member and the front principal point of the second member should be able to come close to coincidence with each other as possible, and the rear principal point of the second member and the front principal point of the third member should likewise be able to come as close to coincidence with each other as possible. To this end it is necessary that each rear principal point of the first and second members should be positioned as rearward as possible in the respective lens members, or, even more preferable, that each principal point is a point outside the rearmost face of each lens member, each front principal point of the second and third members should be positioned as forward as possible in the respective lens systems, or if possible, each front principal point should be at a point outside the foremost face of the respective lens member. It is necessary in such varifocal lens system that the $f$— number of the whole system should not be varied over the varifocal range. For this purpose, the diaphragm must be placed in the rear of the movable lens members. Therefore, the effective aperture of the third member, which is nearest to the diaphragm, is relatively small as is its thickness, and its principal point occupies a point near the front end of the third member. On the other hand, the effective apertures of the first and second members, each further distant from the diaphragm, will necessarily become larger as will the member thicknesses and the principal points will be closer thereto, respectively. Therefore the action of reducing the varifocal range due to the first and second members will be strong, and the necessity of adjusting the positions of the principal points is greatest in these two members. Now, in considering the correction for chromatic aberrations, especially for the all-important lateral chromatic aberration, I have found that the first and second members, when each is spaced widely from the diaphragm, are individually corrected for longitudinal chromatic aberration. If the first and second members are made to meet this requirement by any of the prior known methods, the respective thicknesses of both lens members will become very large, and their principal points will retreat deeply into the respective members, and as a result the varifocal range will be greatly reduced. In order to avoid such reduction of the varifocal range, the first and second members were frequently made as thin as possible, sacrificing the individual longitudinal chromatic correction thereby. In this case, however, the lateral chromatic aberration becomes so large that no clear image is obtained.

The fact that the first member of the lens system of my invention is divided into two elements of positive power, one, the front element consisting of an achromatic compound lens and the other, the rear element, a thin single lens of a refractive power limited by the above mentioned requirements, and that the second member is also divided into two elements of negative power, one, the front element, of a thin single lens of a refractive power likewise limited by the aforementioned requirement and the other, the rear element, consisting of an achromatic compound lens, are effective to improve the above mentioned various difficulties and are positive in overcoming the first item of the above summarized design difficulties. Further, the second item thereof is eliminated by giving appropriate refractive powers to each element of the first and second members so that the aberration of each these members is minimized, and the aberration total of the two members is acceptably small over the entire varifocal range.

In such embodiment as is illustrated, if the achromatic lens of the front element $G_1G_2$ of the first member $B_1$ has its strongly convex surface facing this object side of the system, and the second element $G_3$ is meniscus-shaped with its convex surface also facing the object side of the system and having a radius of curvature $R_4$ within the above mentioned limits, they will be more advantageous in the correction for various aberrations. Especially, the latter will be effective to correct the opening aberration (such as axial and oblique spherical aberrations) in the position where the second member $B_2$ is the farthest from the first member. Arranging the first single negative lens $G_4$ in the second member so as to face with its strong concave surface of radius $R_7$ of a value within the above mentioned limits, to the image side of the system, and arranging the achromatic lens of the second element $G_5G_6$ so as to direct the strong concave surface of radius $R_8$ toward the object side of the system forward will also be advantageous for the correction of various aberrations. Especially is the latter effective to correct the opening aberration. Further, if the cemented surface of radius $R_2$ of the front element in the first member is concave toward the object side, its refractive power is negative, and if the cemented surface $R_9$ of second element in the second member $B_2$ is convex toward the object side, and its action is also selected negative, it will effectively maintain astigmatism in a well corrected state over the entire varifocal range.

To realize these arrangements, it is preferable that the following radii of curvature, and certain of the optical constants of the lens glasses cemented to each other, lie within the following limits:

| Radii of Curvature | Refractive Indices | Abbé Numbers |
|---|---|---|
| $f_1 < R_1 < 3f_1$<br>$0.4f_1 < \|R_2\| < 1.1f_1$<br>$3f_1 < \|R_3\|$<br>$1.5\|f_2\| < R_8 < 3.5\|f_2\|$<br>$0.4\|f_2\| < R_9 < 0.8\|f_2\|$<br>$10 < \|f_2\| < R_{10}$ | $N_2 - N_1 < 0.03$<br>$N_5 - N_6 < 0.04$ | $V_1 - V_2 > 5$<br>$V_5 - V_6 > 15$ | where $f_{\text{subscript}}$ is the focal length of the lens member, $R_{\text{subscript}}$ the radius of curvature of the lens surface, $N_{\text{subscript}}$ the refractive index of the lens glass, and $V_{\text{subscript}}$ the Abbé number of the lens glass, the subscripts increasing in regular order in the direction from the object to the image side of my varifocal lens system. The same notation, plus $d_{\text{subscript}}$ for the thickness at the optical axis of the lens and $S_{\text{subscript}}$ for the air space between successive lenses, also applies to the numerical example of an illustrative embodiment of my varifocal system given below.

A numerical example of a lens system designed for an 8 mm. motion picture camera or projector according to my present invention is as follows:

Shortest focal length _____ mm__ 9.5
Longest focal length _____ 42.5
Varifocal ratio (i.e. the ratio of longest focal length
  to the shortest focal length) _____ 4.5
Aperture ratio _____ 1:1.8

| Member | Lens | Radius of Curvature | Lens Thickness or Air Spacing | Refractive Index | Abbé Number |
|---|---|---|---|---|---|
| $B_1$ | $G_1$ | $R_1 = 187.0$<br>$R_2 = -64.0$ | $d_1 = 9.0$ | $N_1 = 1.6779$ | $V_1 = 55.5$ |
| | $G_2$ | $R_3 = \infty$ | $d_2 = 1.5$<br>$S_1 = 0.5$ | $N_2 = 1.6889$ | $V_2 = 31.1$ |
| | $G_3$ | $R_4 = 81.27$<br>$R_5 = 321.44$ | $d_3 = 3.0$ | $N_3 = 1.6237$ | $V_3 = 47.0$ |
| | | | $S_2$ is variable, from 3.80 to 53.80 as below | | |
| $B_2$ | $G_4$ | $R_6 = 1016.4$<br>$R_7 = 30.33$ | $d_4 = 1.0$<br>$S_3 = 2.887$ | $N_4 = 1.6910$ | $V_4 = 54.8$ |
| | $G_5$ | $R_8 = -107.5$<br>$R_9 = 18.49$ | $d_5 = 1.0$ | $N_5 = 1.6910$ | $V_5 = 54.8$ |
| | $G_6$ | $R_{10} = \infty$ | $d_6 = 4.5$ | $N_6 = 1.6727$ | $V_6 = 32.2$ |
| | | | $S_4$ is variable, from 54.77 to 4.77 as below | | |
| $B_3$ | $G_7$ | $R_{11} = 70.235$<br>$R_{12} = \infty$ | $d_7 = 1.0$ | $N_7 = 1.6383$ | $V_7 = 55.5$ |
| | | | $S_5 = 5.0$ and is variable from 1.0 to 17.67 as below | | |
| $B_4$ | $G_8$ | $R_{13} = 13.80$<br>$R_{14} = -60.0$ | $d_8 = 4.27$<br>$S_6 = 2.13$ | $N_8 = 1.6073$ | $V_8 = 56.7$ |
| | $G_9$ | $R_{15} = -16.75$<br>$R_{16} = -7.94$ | $d_9 = 3.0$ | $N_9 = 1.7200$ | $V_9 = 50.3$ |
| | $G_{10}$ | $R_{17} = 10.73$ | $d_{10} = 1.58$<br>$S_7 = 4.03$ | $N_{10} = 1.6483$ | $V_{10} = 33.9$ |
| | $G_{11}$ | $R_{18} = 33.40$<br>$R_{19} = -33.40$ | $d_{11} = 1.9$<br>$S_8 = 0.16$ | $N_{11} = 1.6204$ | $V_{11} = 60.3$ |
| | $G_{12}$ | $R_{20} = 23.99$<br>$R_{21} = -24.77$ | $d_{12} = 4.0$ | $N_{12} = 1.6204$ | $V_{12} = 60.3$ |

The air spaces $S_2$ and $S_4$ are variable with the axial movement of the first and second members and their numerical values, for the numerical example above and corresponding to the three focal lengths of 10 mm., 20 mm. and 40 mm., are as follows:

| $f$ | 10 mm. | 20 mm. | 40 mm. |
|---|---|---|---|
| $S_2$ | 3.80 | 37.14 | 53.80 |
| $S_4$ | 54.77 | 38.10 | 4.77 |

When the second and third members, $B_2$ and $B_3$, are movable, the fifth air space $S_5$ is also variable—therefore the following lines are added the immediately preceding table:

| | | | |
|---|---|---|---|
| $S_5$ | 17.67 | 1.0 | 17.67 |
| $S_2+S_4+S_5$ | 76.24 | 76.24 | 76.24 (constant) |

Fig. 2 shows the spherical aberration, deviation from the sine condition, astigmatism and lateral chromatic aberration in each of the positions of the lens members for substantially the maximum, substantially the minimum, and for a medium, focal length of 40 mm., 10 mm. and 20 mm., respectively, as given in the tables. In each of the three graphs showing the deviation from the sine condition, the solid line graph is of the spherical aberration and the dashed line graph of the deviation from the sine condition, while in each of the three graphs showing the astigmatic aberration, the solid line graph is that of the sagital field curvature and the dashed line graph that of the meridional field curvature. From the graphs the stable and excellent correction of the varifocal system of my invention is clearly and readily discernible.

What I claim is:

1. A varifocal lens system comprising a first, a second and a third lens member air spaced from each other and aligned on a common optical axis, the first lens member having positive refractive power and being movable axially relative to the second lens member to produce the final image at a predetermined fixed position over the entire range of magnification, the second lens member having negative refractive power and being movable axially to vary the magnification of the whole system, the third lens member having positive refractive power, the first lens member consists of a first front lens element and a rear second positive lens element separated by an air space, the first front lens element consisting of a first positive lens and a first negative lens cemented to each other, the second rear lens element being a single meniscus lens of a refractive power greater than 0.4 times but smaller than 0.9 times the power of the first lens member, the first meniscus lens front convex surface having a radius of curvature greater than 0.4 times and smaller than the focal length of the first lens member and the radius of curvature of the rear concave surface of the meniscus lens is greater than the focal length of the first lens member but less than infinity, the second lens member consists of a front second negative lens element and a third negative rear lens element separated by an air space, the front lens element thereof being a single lens of refractive power larger than 0.4 times and smaller than 0.9 times the power of the second lens member, the radius of curvature of the front surface of the front second negative lens is greater than three times the absolute value of the focal length of the second lens member and less than infinity, and the radius of curvature of the rear concave surface of the front second negative lens is greater than half and smaller than twice the absolute value of the focal length of the second lens member, and the third negative lens element is composed of a third negative and a third positive lens cemented together.

2. The varifocal lens system according to claim 1 wherein the front convex surface of the front first positive lens of the first lens member has a radius of curvature which is larger than and less than three times the focal length of the first lens member, and the rear surface of the first front lens element has a radius of curvature which is numerically larger than three times the numerical value of the focal length of the first lens member.

3. The varifocal lens system according to claim 2 wherein the first positive lens of the front lens element of the first lens member has a refractive index not in excess of 0.03 smaller than that of the first negative lens to which it is cemented, the Abbé number of the first positive lens being larger by at least 5 than that of the first negative lens, and the cemented surface is concave to the front and has a radius of curvature which is numerically larger than 0.4 times the focal length of the first lens member but smaller than 1.1 times the focal length of the first lens member.

4. The varifocal lens system according to claim 1 wherein the third negative rear lens element of the second lens member has a front concave surface of which the radius of curvature is numerically larger than 1.5 times and smaller than 3.5 times the focal length of the second lens member, and a rear surface of which the radius of curvature is numerically larger than ten times the focal length of the second lens member.

5. The varifocal lens system according to claim 4 wherein the third negative lens has a refractive index larger by not more than 0.04 than that of the third positive lens to which it is cemented, the third negative lens having an Abbé number larger by at least 15 than that of the third positive lens, and the cemented surface is convex to the front and has a radius of curvature which is larger than 0.4 times but smaller than 0.8 times the focal length of the second lens member.

6. A varifocal lens system comprising a first lens member $B_1$ of positive refractive power and comprising an achromatic compound lens $G_1G_2$ and a positive meniscus lens $G_3$, a second lens member $B_2$ of negative refractive power and comprising a front negative lens $G_4$ and a rear achromatic compound lens $G_5G_6$, and a third lens member $B_3$ consisting of a single positive lens $G_7$, the three lens members being aligned axially and air spaced from each other along a common optical axis, the second lens member being movable axially between the first and third lens members, and at least one of the first and third lens members is simultaneously movable axially relative to the second lens member to position the image formed by the system at a predetermined fixed position for all focal lengths to which the system is adjustable, the system having substantially the following numerical data:

Shortest focal length _____ mm ____ 9.5
Longest focal length _____ mm ____ 42.5
Aperture ratio _____ F:1.8

| Member | Lens | Radius of Curvature | Lens Thickness or Air Spacing | Refractive Index | Abbé Number |
|---|---|---|---|---|---|
| $B_1$ | $G_1$ | $R_1 = 187.0$ | $d_1 = 9.0$ | $N_1 = 1.6779$ | $V_1 = 55.5$ |
| | $G_2$ | $R_2 = -64.0$ | $d_2 = 1.5$ | $N_2 = 1.6889$ | $V_2 = 31.1$ |
| | | $R_3 = \infty$ | $S_1 = 0.5$ | | |
| | $G_3$ | $R_4 = 81.27$ | $d_3 = 3.0$ | $N_3 = 1.6237$ | $V_3 = 47.0$ |
| | | $R_5 = 321.44$ | $S_2$ variable | | |
| $B_2$ | $G_4$ | $R_6 = 1016.4$ | $d_4 = 1.0$ | $N_4 = 1.6910$ | $V_4 = 54.8$ |
| | | $R_7 = 30.33$ | $S_3 = 2.887$ | | |
| | $G_5$ | $R_8 = -107.5$ | $d_5 = 1.0$ | $N_5 = 1.6910$ | $V_5 = 54.8$ |
| | $G_6$ | $R_9 = 18.49$ | $d_6 = 4.5$ | $N_6 = 1.6727$ | $V_6 = 32.2$ |
| | | $R_{10} = \infty$ | $S_4$ variable | | |
| $B_3$ | $G_7$ | $R_{11} = 70.235$ | $d_7 = 1.0$ | $N_7 = 1.6383$ | $V_7 = 55.5$ |
| | | $R_{12} = \infty$ | | | | where $B_{subscript}$ is the member number, $G_{subscript}$ the lens number, $R_{subscript}$ the radius of curvature of the lens surface, $d_{subscript}$ the thickness of the lens at the optical axis, $S_{subscript}$ the air space between successive lenses, $N_{subscript}$ the refractive index of the lens glass, and $V_{subscript}$ the Abbé number of the lens glass, all subscripts increasing in regular order in the direction from the object to the image side of the varifocal system.

7. The varifocal system according to claim 6 in which the first lens member $B_1$ is movable and the third lens member $B_3$ is at a fixed position air spaced a distance $S_5$ from a fourth lens member $B_4$, the fourth lens member comprising a first component of a single lens $G_8$, a second component of a compound lens $G_9G_{10}$, a third component of a single lens $G_{11}$, and a fourth component of a single lens $G_{12}$, in which substantially the following numerical data obtains:

| Lens | Radius of Curvature | Lens Thickness or Air Spacing | Refractive Index | Abbé Number |
|---|---|---|---|---|
| $G_8$ | $R_{13}=13.80$ $R_{14}=-60.0$ | $S_5=5.0$ $d_8=4.27$ $S_6=2.13$ | $N_8=1.6073$ | $V_8=56.7$ |
| $G_9$ | $R_{15}=-16.75$ $R_{16}=-7.94$ | $d_9=3.0$ | $N_9=1.7200$ | $V_9=50.3$ |
| $G_{10}$ | $R_{17}=10.73$ | $d_{10}=1.58$ $S_7=4.03$ | $N_{10}=1.6483$ | $V_{10}=33.9$ |
| $G_{11}$ | $R_{18}=33.40$ $R_{19}=-33.40$ | $d_{11}=1.9$ $S_8=0.16$ | $N_{11}=1.6204$ | $V_{11}=60.3$ |
| $G_{12}$ | $R_{20}=23.99$ $R_{21}=-24.77$ | $d_{12}=4.0$ | $N_{12}=1.6204$ | $V_{12}=60.3$ |

8. The varifocal system according to claim 6 in which the first lens member $B_1$ is fixed in position and the third lens member $B_3$ is movable, and a fourth lens member $B_4$ is air spaced from the third lens member on the common optical axis a distance $S_5$, the fourth lens member comprising a first component of a single lens $G_8$, a second component of a compound lens $G_9G_{10}$, a third component of a single lens $G_{11}$ and a fourth component of a single lens $G_{12}$, in which substantially the following numerical data obtains:

| Lens | Radius of Curvature | Lens Thickness or Air Spacing | Refractive Index | Abbé Number |
|---|---|---|---|---|
| $G_8$ | $R_{13}=13.80$ $R_{14}=-60.0$ | $S_5$ variable $d_8=4.27$ $S_6=2.13$ | $N_8=1.6073$ | $V_8=56.7$ |
| $G_9$ | $R_{15}=-16.75$ $R_{16}=-7.94$ | $d_9=3.0$ | $N_9=1.7200$ | $V_9=50.3$ |
| $G_{10}$ | $R_{17}=10.73$ | $d_{10}=1.58$ $S_7=4.03$ | $N_{10}=1.6483$ | $V_{10}=33.9$ |
| $G_{11}$ | $R_{18}=33.40$ $R_{19}=-33.40$ | $d_{11}=1.9$ $S_8=0.16$ | $N_{11}=1.6204$ | $V_{11}=60.3$ |
| $G_{12}$ | $R_{20}=23.99$ $R_{21}=-24.77$ | $d_{12}=4.0$ | $N_{12}=1.6204$ | $V_{12}=60.3$ |

References Cited in the file of this patent

UNITED STATES PATENTS 2,844,996    Klemt _____ July 29, 1958

FOREIGN PATENTS 1,120,271    France _____ Apr. 16, 1956
1,123,471    France _____ June 11, 1956
597,354    Germany _____ May 25, 1934
713,024    Great Britain _____ Aug. 4, 1954